United States Patent
Yamanaka et al.

(10) Patent No.: US 8,032,282 B2
(45) Date of Patent: Oct. 4, 2011

(54) DAMPING CHARACTERISTICS CONTROL APPARATUS FOR A VEHICLE SUSPENSION

(75) Inventors: Toshihiko Yamanaka, Kariya (JP); Ryuichi Kurosawa, Okazaki (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 466 days.

(21) Appl. No.: 12/340,056

(22) Filed: Dec. 19, 2008

(65) Prior Publication Data

US 2009/0164064 A1 Jun. 25, 2009

(30) Foreign Application Priority Data

Dec. 21, 2007 (JP) ................................. 2007-330725

(51) Int. Cl.
*B60G 17/015* (2006.01)
(52) U.S. Cl. ....................................... 701/37; 280/5.515
(58) Field of Classification Search .................. 701/37, 701/40; 280/5.515, 5.519
See application file for complete search history.

(56) References Cited

U.S. PATENT DOCUMENTS

| | | | |
|---|---|---|---|
| 5,322,320 A | 6/1994 | Sahashi et al. | |
| 5,324,069 A | 6/1994 | Ogawa | |
| 6,298,293 B1 * | 10/2001 | Ohsaku | 701/37 |
| 6,314,353 B1 * | 11/2001 | Ohsaku et al. | 701/37 |
| 6,321,887 B1 * | 11/2001 | Kurusu et al. | 188/266.2 |
| 2002/0032508 A1 * | 3/2002 | Uchino et al. | 701/37 |
| 2002/0045977 A1 * | 4/2002 | Uchiyama et al. | 701/37 |
| 2004/0128040 A1 * | 7/2004 | Stiller et al. | 701/37 |
| 2004/0212159 A1 * | 10/2004 | Stiller | 280/5.515 |
| 2005/0038584 A1 * | 2/2005 | Kim | 701/37 |
| 2005/0113997 A1 * | 5/2005 | Kim | 701/37 |
| 2008/0004771 A1 * | 1/2008 | Masamura | 701/37 |
| 2008/0009992 A1 * | 1/2008 | Izawa et al. | 701/37 |
| 2008/0059025 A1 * | 3/2008 | Furuichi | 701/37 |
| 2010/0106368 A1 * | 4/2010 | Hidaka et al. | 701/38 |

FOREIGN PATENT DOCUMENTS

| | | |
|---|---|---|
| JP | 5-294122 A | 11/1993 |
| JP | 05-294122 A | 11/1993 |
| JP | 06-143965 A | 5/1994 |
| JP | 6-156036 A | 6/1994 |
| JP | 2911368 B2 | 4/1999 |
| JP | 2911368 B2 | 6/1999 |

OTHER PUBLICATIONS

U.S. Appl. No. 12/605,873, filed Oct. 26, 2009, Hidaka et al.
"A Kinetics Model of Traffic Environments for Intelligent Vehicle Guidance" distributed at 5th World Congress on Intelligent Transport Systems, Oct. 12-16, 1998, Seoul Korea.

* cited by examiner

*Primary Examiner* — Ruth Ilan
(74) *Attorney, Agent, or Firm* — Buchanan Ingersoll & Rooney PC

(57) ABSTRACT

A damping characteristics control apparatus is provided for a vehicle suspension having a shock absorber mounted between a sprung member and an unsprung member for each wheel. Damping force of the shock absorber is controlled on the basis of damping coefficient obtained by $$C(\text{absorber}) = (\text{Gain} * |y-z|/|y'|) * [(T|z'|+L)/|y-z|]^p$$

wherein C(absorber); damping coefficient, z'; sprung velocity, y'; unsprung velocity, |y−z|; relative displacement, T; interval time of sprung member moving relative to unsprung member, L; displacement of sprung member stopped against unsprung member, Gain; control gain, p; parameter for determining effective range for control about neutral position of absorber.

4 Claims, 3 Drawing Sheets

DAMPING CHARACTERISTICS CONTROL APPARATUS FOR A VEHICLE SUSPENSION

This application is based on and claims priority under 35 U.S.C. Sec. 119 to Japanese Patent Application No. 2007-330725, filed on Dec. 21, 2007, the entire content of which is herein incorporated by reference.

BACKGROUND OF THE INVENTION

The present invention relates to a damping characteristics control apparatus for a vehicle suspension, and particularly relates to a damping characteristics control apparatus for controlling damping characteristics of a shock absorber mounted between a sprung member and an unsprung member for each wheel of a vehicle.

With respect to the damping characteristics control apparatus, it is known heretofore that the damping characteristics of the shock absorber is controlled according to a control law of a skyhook damper, to provide C(absorber) for a damping coefficient of the shock absorber as follows;

$$C(absorber)=C(skyhook)*[z'/(y'-z')]$$

wherein "C(skyhook)" is a skyhook damping coefficient, "z'" is velocity of a sprung member and "y'" is velocity of an unsprung member, respectively, in a moving direction of the shock absorber, which is the differentiated value of a displacement "z" and the differentiated value of a displacement "y", respectively, and "(y'−z')" is vertically relative velocity between the sprung member and the unsprung member.

The skyhook damping coefficient C(skyhook) should be of a value which is set to be relatively low for an input with its high frequency vibration component from a normal road surface prevailing, and a value which is set to be relatively high for an input with its low frequency vibration component from an irregular road surface prevailing. For example, if the skyhook damping coefficient C(skyhook) was set to be of the relatively low value, a ride comfort could be obtained against the high frequency component of the road surface, whereas, vibration of the vehicle body could not be damped appropriately on the irregular road having the low frequency component. On the contrary, if the skyhook damping coefficient C(skyhook) was set to be of the relatively high value, it could be appropriate for the irregularity, but the ride comfort on the rough road would be deteriorated. In order to solve these problems, it is proposed to change the skyhook damping coefficient C(skyhook) into a high value or a low value in response to vibration of the vehicle body, in Japanese Patent Laid-open Publication No. H05-294122, which corresponds to U.S. Pat. No. 5,324,069. That is, it is proposed to detect acceleration of a mass body (sprung member) for each wheel, and obtain signals by passing the acceleration through a low-pass filter and a high-pass filter, on the basis of which it is determined whether the vibration of the mass body has been resulted from the high frequency component or the low frequency component. Then, if the low frequency component prevails, the value of the damping coefficient C(skyhook) will be increased.

According to other means for solving that problem, in Japanese Patent Laid-open Publication No. H06-156036, it is proposed to achieve the skyhook control by changing modes for damping force in response to positive sign or negative sign of the velocity (z') of the sprung member. Furthermore, Japanese Patent No. 2911368 discloses an equation of motion for a vehicle following a lead vehicle, based on its back and forth motion which will fit a physiology of human sensations.

Although the skyhook damping coefficient C(skyhook) is provided to be of a constant value, if the sign of $z'*(y'-z')$ is negative, it is required to change the skyhook damping coefficient C(skyhook) into the one of a very low value Cmini. With this low value Cmini being employed, the motion of the unsprung member will be damped. Depending on the value Cmini to be set, the changing motion will be repeated often without the motion of the unsprung member being restrained, to cause repetition of the low value and high value, which might deteriorate the ride comfort. Therefore, according to this control law, in the case where its sign of $z'*(y'-z')$ is negative, which corresponds to a half of the motion conditions, it will be excluded from the control, to be changed into the low value Cmini. As the control itself does not fulfill the half of the motion conditions, and the skyhook damping coefficient C(skyhook) is a fixed value even in the case where the control is effective, the equation of the control as it is could not meet every road conditions in a general state employing it.

According to the aforementioned skyhook control law, therefore, if the sign of $z'*(y'-z')$ is negative, the actual damping coefficient of the shock absorber C(absorber) will be of a negative value. In order to avoid this, the value employed in that period has been changed into the low value Cmini without performing the control, or a control law for changing the skyhook damping coefficient C(skyhook) depending on the frequency component of the sprung acceleration, has been added. However, only by means of that skyhook control law, the vibration of the sprung member will not be damped appropriately. This is resulted from the fact that the control shall not be performed in principle, in the case where the sign of $z'*(y'-z')$ is negative, and that the value of the skyhook damping coefficient C(skyhook) will have to be changed, against the vibration of the sprung member caused by a rapid change of the control conditions due to the former fact. Furthermore, as the value of the skyhook damping coefficient C(skyhook) has been set to be the fixed damping coefficient, the value of the skyhook damping coefficient C(skyhook) has to be set appropriately.

However, even if the value of the skyhook damping coefficient C(skyhook) has been set appropriately, any appropriate shock absorber damping coefficient C(absorber) can not be obtained on the basis of the aforementioned control law of $C(absorber)=C(skyhook)*[z'/(y'-z')]$, as long as it is the fixed value. Therefore, by changing the value of the skyhook damping coefficient C(skyhook) and Cmini depending on the road surface conditions, or providing two fixed damping characteristics for the specific characteristics of the skyhook control, to change two control modes depending on the negative or positive sign of the sprung acceleration, the skyhook characteristics has been realized artificially, with the fixed damping force characteristics, to result in a control for changing damping force characteristic modes, which is substantially different from the skyhook control law.

Also, in order to realize the skyhook control, complicated additional control means will be required. However, even if the skyhook control was completely realized, the vibration of the vehicle body suspended through the skyhook by the fixed shock absorber would be a mechanical free vibration of a spring mass system, and would hardly become a vibration based on the human physiology. In order to solve this problem, it is desired to restrain the vibration of the sprung member by means of only a single control law, without performing any change of damping force or damping force mode, which is different from the skyhook control law requiring the changeover.

SUMMARY OF THE INVENTION

Thus, a need exists for a damping characteristics control apparatus which is not susceptible to the drawback mentioned above.

In accomplishing the above and other objects, a damping characteristics control apparatus is provided for a vehicle suspension having a shock absorber mounted between a sprung member and an unsprung member for each wheel of a vehicle, which comprises a sprung velocity detection device for detecting a velocity of the sprung member in a moving direction of the shock absorber, an unsprung velocity detection device for detecting a velocity of the unsprung member in a moving direction of the shock absorber, and a relative displacement detection device for detecting a relative displacement between the sprung member and the unsprung member. Then, a damping coefficient calculation device is provided for calculating a damping coefficient provided for an equation of motion of the sprung member following the unsprung member. The damping coefficient is obtained by the following equation;

$$C(\text{absorber}) = (\text{Gain} \ast |y-z|/|y'|) \ast [(T|z'|+L)/|y-z|]^p$$

wherein "C(absorber)" is the damping coefficient, "z'" is the sprung velocity, "y'" is the unsprung velocity, "|y−z|" is the relative displacement, "T" is interval time of the sprung member moving relative to the unsprung member, which is used as a parameter for weighting the motion of the sprung member, "L" is a displacement of the sprung member stopped against the unsprung member, "Gain" is a control gain, and "p" is a parameter for determining an effective range for a control about a neutral position of the shock absorber.

And, a damping control device is provided for controlling a damping force of the shock absorber on the basis of the damping coefficient calculated by the damping coefficient calculation device.

BRIEF DESCRIPTION OF THE DRAWINGS

The above stated object and following description will become readily apparent with reference to the accompanying drawings, wherein like referenced numerals denote like elements, and in which.

DETAILED DESCRIPTION OF EMBODIMENT

Figure 1:
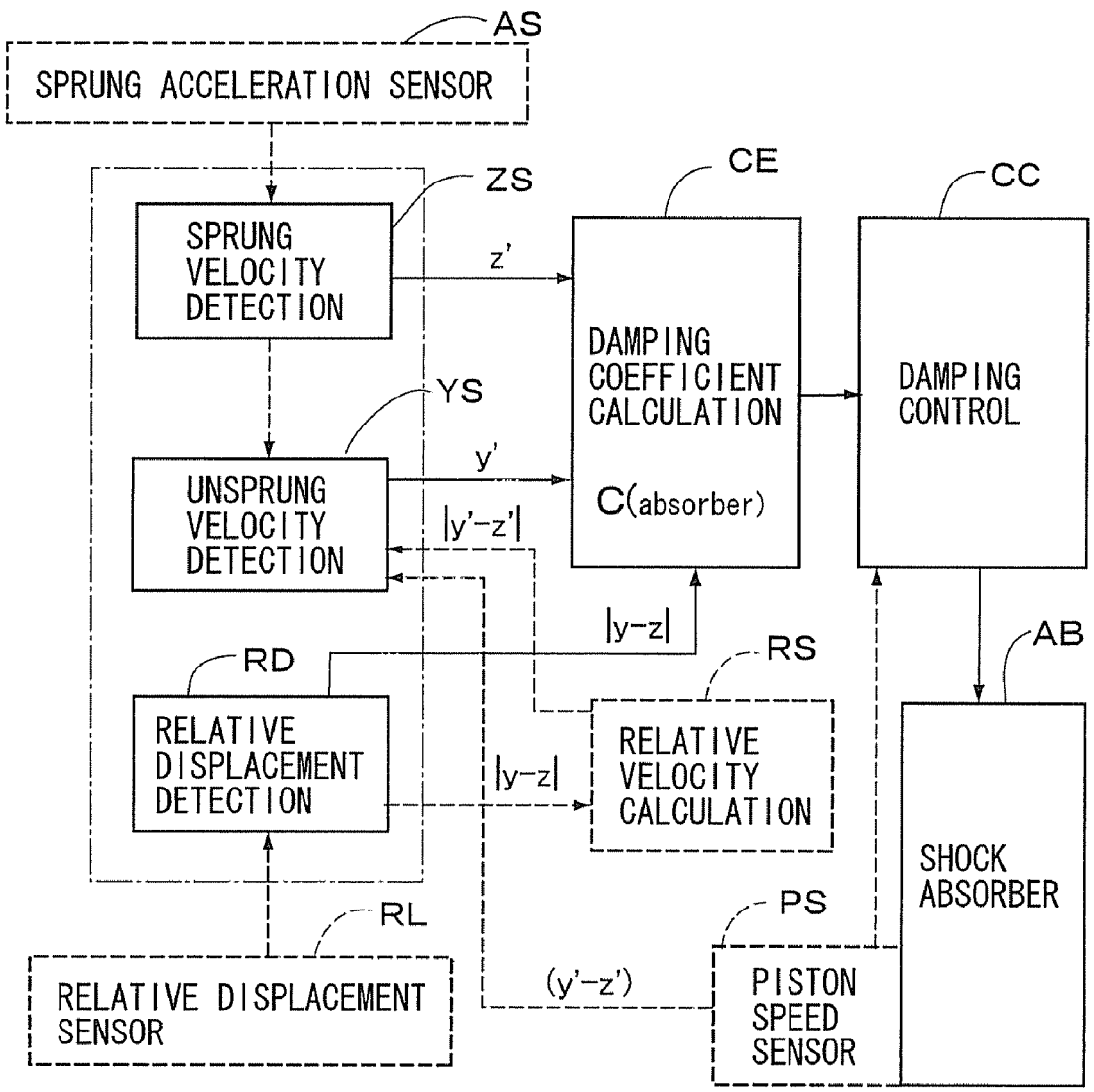
FIG. 1 is a schematic block diagram showing a main structure of a damping characteristics control apparatus according to an embodiment of the present invention.
Figure 2:
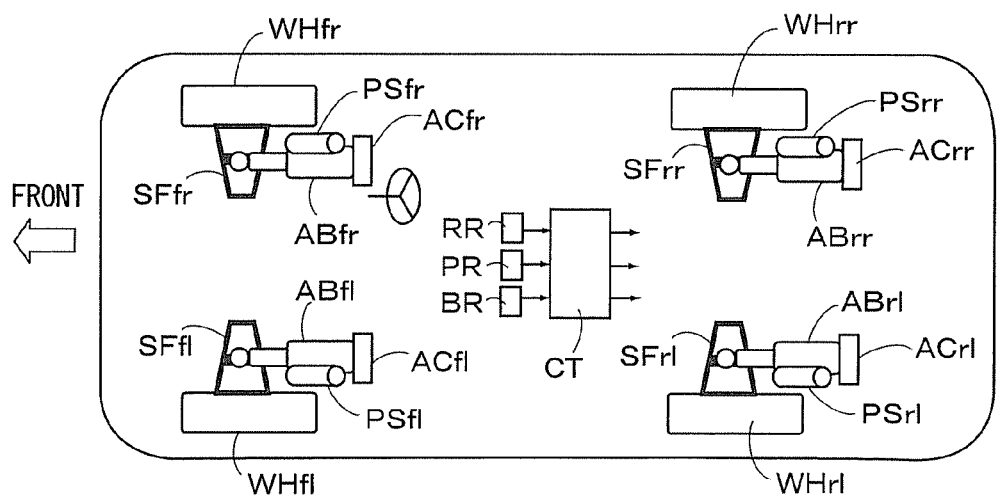
FIG. 2 is a plan view of a vehicle having a damping characteristics control apparatus according to an embodiment of the present invention.
Figure 3:
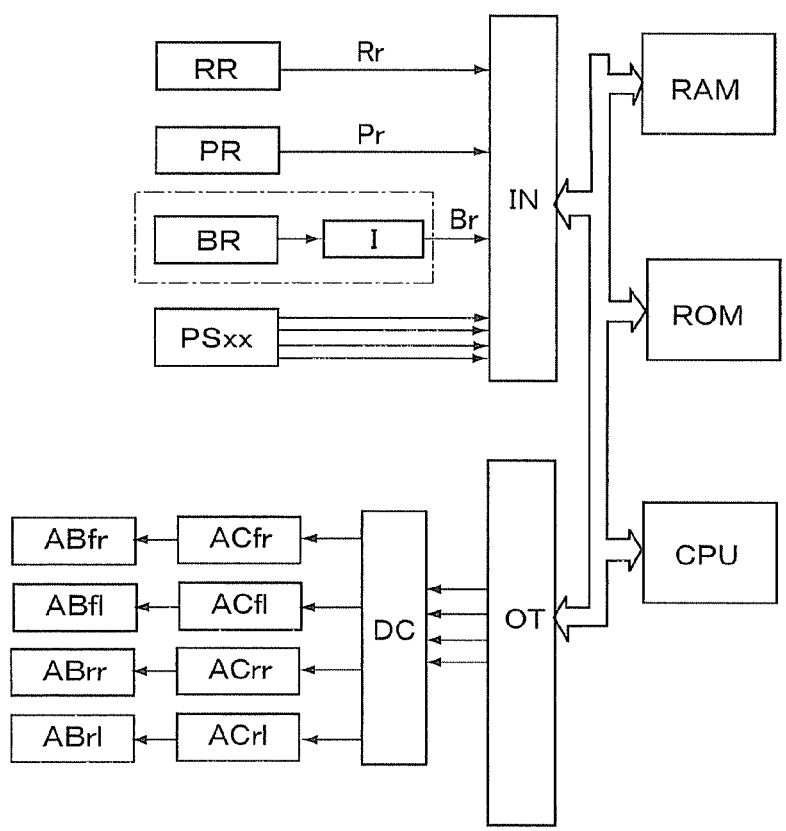
FIG. 3 is a schematic block diagram showing a control device including a damping characteristics control apparatus according to an embodiment of the present invention.

Referring to FIG. 1, there is schematically illustrated a damping characteristics control apparatus according to an embodiment of the present invention. FIG. 2 shows a structure of a vehicle having the damping characteristics control apparatus, and FIG. 3 shows a block diagram of its control device. As shown in FIG. 1, the damping characteristics control apparatus of the present embodiment is provided with a sprung velocity detection device ZS for detecting a velocity (z') of a sprung member in a moving direction thereof (hereinafter called as sprung velocity (z')), an unsprung velocity detection device YS for detecting a velocity (y') of an unsprung member in a moving direction thereof, i.e., upward and downward (hereinafter called as unsprung velocity (y')), and a relative displacement detection device RD for detecting a relative displacement |y−z| between the sprung member and the unsprung member.

Furthermore, there is provided a damping coefficient calculation device CE for calculating a damping coefficient C(absorber) used for an equation of motion of the sprung member following the unsprung member, based on the relative displacement |y−z|, sprung velocity (z') and unsprung velocity (y'), and obtained by the following equation:

$$C(\text{absorber}) = (\text{Gain} \ast |y-z|/|y'|) \ast [(T|z'|+L)/|y-z|]^p$$

wherein "z'" is the sprung velocity, "y'" is the unsprung velocity, "|y−z|" is the relative displacement, "T" is interval time of the sprung member moving relative to the unsprung member, which is used as a parameter for weighting the motion of the sprung member, "L" is a displacement of the sprung member stopped against the unsprung member, "Gain" is a control gain, and "p" is a parameter for determining an effective range for a control about a neutral position of a shock absorber.

And, there is provided a damping control device CC for controlling the damping force of the shock absorber AB on the basis of the damping coefficient C(absorber) calculated by the damping coefficient calculation device CE. That is, provided that a piston speed of the shock absorber AB is (y'−z'), the shock absorber AB is so controlled to produce the damping force of C(absorber)*(y'−z').

As indicated by chain lines in FIG. 1, as for a sprung acceleration detection device for detecting an acceleration (z") of the sprung member in a moving direction thereof, i.e., upward and downward, a sprung acceleration detection sensor AS may be provided, and it may be so constituted that the acceleration (z") detected by the sprung acceleration detection sensor AS is integrated by the sprung velocity detection device ZS to obtain the sprung velocity (z'). As for the unsprung velocity detection device YS, it may be provided with a relative velocity calculation device RS for calculating a relative velocity |y'−z'| on the basis of the relative displacement |y−z| detected by the relative displacement detection device RD, which may be constituted by a relative displacement sensor RL indicated by the broken line, and it may be so constituted that the sprung velocity (z') is added to the calculated relative velocity |y'−z'|, to obtain the unsprung velocity (y'). Or, as indicated by the broken line, there may be provided a piston speed sensor PS for detecting a piston speed (y'−z') of the shock absorber AB, and it may be so constituted that the sprung velocity (z') is added to the detected piston speed (y'−z'), to obtain the unsprung velocity (y').

FIG. 2 illustrates an overall structure of the vehicle having the damping characteristics control apparatus as described above, wherein a vehicle body (not shown) is suspended by a suspension frame SFxx and shock absorber ABxx for supporting each wheel WHxx, wherein "xx" designates each wheel, i.e., "fr" designates the wheel at the front right side, "fl" designates the wheel at the front left side, "rr" designates the wheel at the rear right side, and "rl" designates the wheel at the rear left side. The upper end of the shock absorber ABxx for each wheel is supported by the vehicle body (not shown) served as the aforementioned sprung member, whereas the lower end of the shock absorber ABxx is supported by the suspension frame SFxx served as the aforementioned unsprung member. In each shock absorber ABxx, as in the prior apparatus, there is accommodated a piston (not shown) having a regulator valve for regulating the damping coefficient piston by an actuator ACxx, or an orifice, and there is disposed a piston speed sensor PSxx for detecting the respective piston speed (y1'−z1') to (y4'−z4'). In addition, in the vicinity of the center of gravity of the vehicle, there are disposed a roll rate sensor RR for detecting a roll rate (Rr) of the vehicle body, a pitch rate sensor PR for detecting a pitch rate (Pr) of the vehicle body, a bouncing acceleration sensor BR for detecting a bouncing acceleration of the vehicle body and so on, which are connected to a controller CT.

The signals detected by the piston speed sensor PSxx, roll rate sensor RR, pitch rate sensor PR, bouncing acceleration sensor BR and so on are input to an input port IN as shown in FIG. 3. As the signal detected by the bouncing acceleration sensor BR is integrated by an integrator I to output the bouncing velocity (Br), bouncing velocity detection device is constituted as indicated by a frame of one-dotted chain line in FIG. 3. The input port IN is connected to CPU, ROM and RAM, which constitute the controller CT as shown in FIG. 2, and whose structure and operation are known heretofore, together with an output port OT, through a bas bar. The output port OT is connected to each actuator ACxx of each shock absorber ABxx through a driving circuit DC, to be actuated individually.

Accordingly, the sprung velocity (z1')−(z4') for each wheel WHxx, i.e., the sprung velocity (z1') for the wheel at the front left side, sprung velocity (z2') for the wheel at the rear left side, sprung velocity (z3') for the wheel at the front right side and sprung velocity (z4') for the wheel at the rear right side are calculated as follows:

$$z1'=Rr*Tr/2-Pr*Lf+Br$$

$$z2'=Rr*Tr/2+Pr*Lr+Br$$

$$z3'=-Rr*Tr/2-Pr*Lf+Br$$

$$z4'=-Rr*Tr/2+Pr*Lr+Br$$

where the roll rate (Rr rad/sec) with the rightward roll angle in the left turning operation is set to be of the positive sign, the pitch rate (Pr rad/sec) with the pitch angle in the nose-dive direction is set to be of the positive sign, and the bouncing velocity (Br m/sec) with the bouncing motion upward from the vehicle body is set to be of the positive sign. "Lf (m)" and "Lr (m)" are the distance between the front axle and the gravity center of the vehicle body, and the distance between the rear axle and the gravity center, respectively. "Tr (m)" is the tread between the front axle and the rear axle. Alternatively, the sprung velocity (z1')−(z4') may be measured directly, as indicated by the solid line in FIG. 1.

And, based on the sprung velocity (z1')−(z4') for each wheel WHxx and the piston speed (y1'−z1') to (y4'−z4') for each actuator ACxx, the unsprung velocity (y1') for the wheel at the front left side, unsprung velocity (y2') for the wheel at the rear left side, unsprung velocity (y3') for the wheel at the front right side and unsprung velocity (y4') for the wheel at the rear right side are calculated as follows:

$$y1'=z1'+(y1'-z1')$$

$$y2'=z2'+(y2'-z2')$$

$$y3'=z3'+(y3'-z3')$$

$$y4'=z4'+(y4'-z4')$$

According to the present embodiment, based on the result of calculation using detected signals as described above, the following control law is considered. Since the sprung member and the unsprung member have such a relationship that they will not contact with each other, nor will be away from each other, even if the unsprung member follows small variation of the road surface, the sprung member will not follow the unsprung member immediately thereafter. If the sprung member moves too close to the unsprung member, the sprung member will immediately return by its own motion to a neutral position placed at an appropriate distance away from the unsprung member. Or, if the sprung member moves too remote from the unsprung member, the sprung member will immediately return by its own motion to the neutral position placed at the appropriate distance away from the unsprung member. Thus, as a whole, the control law with the sprung member moving along the road surface is considered. In this case, the "its own motion" used in the phrase of "the sprung member will immediately return by its own motion to the neutral position" is meant by "it will return by a smooth motion which fits to the physiology of human sensations", and based on the motion of the vehicle following the lead vehicle as disclosed in the Japanese Patent No. 2911368. According to the technology as disclosed in the Japanese Patent, even if the lead vehicle was accelerated or decelerated randomly, the following vehicle could smoothly follow the lead vehicle by its own smooth motion, maintaining such a relationship that they will not contact with each other, nor will be away from each other. According to the present invention, therefore, with the unsprung member being substituted for the lead vehicle, and with the sprung member being substituted for the following vehicle, the equation of the vehicle's motion following the lead vehicle is used for the equation of the sprung member's motion following the unsprung member, as it is, to control the damping force of the shock absorber. With the smooth motion of the sprung member being employed, the motion control for the sprung member and the unsprung member can be achieved such that they will not contact with each other, nor will be away from each other.

As for the physiological law ruling human sensations, there is known "Weber's law", which provides a relationship of $\Delta S/S=C$ (constant), where "S" represents amount of physical stimulus, and "$\Delta S$" represents minimum noticeable increment of the stimulus. In order that motion of a vehicle (Z) achieves a comfortable motion to fit the human physiology, the sensible acceleration (z") in the moving direction of the vehicle (Z) is required to meet the Weber's law. Provided that the sensible acceleration (z") is used for the physical stimulus (S), i.e., S=z", Z" to meet the Weber's law result in $\Delta z''/z''=C$, which is transformed into $(z'')'\Delta t/z''=C$, $(z'')'=Cz''$. By integrating this equation, obtained is $z''=a-Cz'$, where "a" is an integration constant.

Thus, the equation of [z"=a−Cz'] obtained by the Weber's law as described above represents the equation of motion of the vehicle (Z) performing the motion which fits to the human physiology.

Supposing that the above-described equation of motion is employed for the equation of motion in the back and forth direction, and the vehicle (Z) is following the lead vehicle (Y, position: y, velocity: y'), its equation of motion will provide the following equation (1), to achieve the comfortable back and forth motion, which fits to the human physiology, thereby to follow the lead vehicle (Y). The detailed explanation will be omitted herein, because it is described in the Japanese Patent No. 2911368.

$$z''=a-(a/y')*[(Tz'+L)/(y-z)]^P*z' \qquad (1)$$

wherein "a" is the maximum vehicle acceleration, "T" is interval time of the vehicle moving relative to the lead vehicle, "L" is interval distance of the vehicle stopped against the lead vehicle, and "p" is a parameter for determining an effective range for the conditions to follow.

Next, motion in the upward and downward direction is substituted for the above-described motion in the back and forth direction. That is, supposing that the wheel of the unsprung member is substituted for the lead vehicle (Y), and that the vehicle body of the sprung member is substituted for the following vehicle (Z), the wheel (Y) of the unsprung member will be moved freely, whereas the vehicle body (Z) of the sprung member will follow it with a comfortable motion for human sensations, to move upward and downward. Therefore, the shock absorber is substituted for the section constituting the damping coefficient, $(a/y')*[(Tz'+L)/(y-z)]^p*z'$, in the above-described equation of motion. In this substitution, as the damping force of the shock absorber is produced by the relative motion between the sprung member and the unsprung member without being distinguished from each other, the state variable is used with its absolute value, and the spring force is substituted for "a", to provide $Gain*|y-z|$. Thus, the following equation (2) is obtained:

$$C(\text{absorber}) = (Gain*|y-z|/|y'|)*[(T|z'|+L)/|y-z|]^p \quad (2)$$

wherein "C(absorber)" is the damping coefficient, "z'" is the sprung velocity, "y'" is the unsprung velocity, "|y-z|" is the relative displacement, "T" is interval time of the sprung member moving relative to the unsprung member, which is used as a parameter for weighting the motion of the sprung member, "L" is a displacement of the sprung member stopped against the unsprung member, "Gain" is a control gain, and "p" is a parameter for determining an effective range for a control about a neutral position of the absorber.

Accordingly, based on the unsprung velocity (y'), sprung velocity (z') and relative displacement |y-z| between the sprung member and the unsprung member, the damping coefficient C(absorber) is obtained to realize the comfortable motion of the sprung member. It is physically meant that the value of damping coefficient C(absorber) will become small, when |y'| is large, i.e., when the unsprung member moves, whereas it will become large, when |z'| is large, i.e., when the sprung member moves. In other words, when influence of the road surface is large, a relatively soft shock absorber will be constituted, whereas, when the sprung member moves due to the rolling motion or the like, a relatively rigid shock absorber will be constituted. In addition, as the above-described equation (2) is provided by the physiological law ruling human sensations, a smooth motion for human beings can be realized.

According to the damping characteristics control apparatus as constituted above, it will become unnecessary to design the shock absorber having a complicated damping force characteristic with its extending side and compressing side being fitted to the traveling conditions or way of using the vehicle, whereby designing the shock absorber will be made simple. Also, because of a simple control without providing various conditions, designing trouble will be hardly caused, and even if it was caused, measures against it could be made easily. Furthermore, since a part of the equation of human motion has been employed, flexibility will be provided such that additional controls such as the pitch control can be incorporated easily. Unlike the aforementioned sky hook control, which requires the rapid changeover of the control depending on change of sign of [(sprung velocity)×(piston speed)], the response speed of the actuator can be made relatively low, so that the apparatus can be constituted at a relatively low cost.

Figure 4:
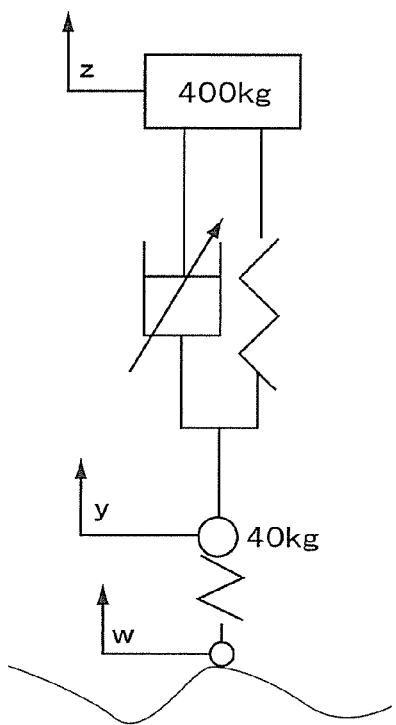
FIG. 4 is a diagram showing a simulation model according to an embodiment of the present invention.

Provided that the control is performed according to the above-described equation (2), by applying a relatively soft damping to a rapid motion of the unsprung member so as to hardly apply the force to the sprung member, not to follow the unsprung member, and when the sprung member moves due to rolling motion or the like, by applying a relatively rigid damping to the sprung member, the sprung member will have difficulty in moving. In order to ensure those characteristics, a simulation test has been made according to the following conditions. That is, the simulation test has been made according to a single wheel model as shown in FIG. 4, wherein p=1, T=7, Gain=750 are set, and between the sprung mass (M=400 kg) and the unsprung mass (m=40 kg), a spring of a spring constant (k=14400(N/m)) and the above-described shock absorber are disposed in parallel with each other, with a tire of a spring constant (k=10K) contacting on the road surface (w).

Figure 5:
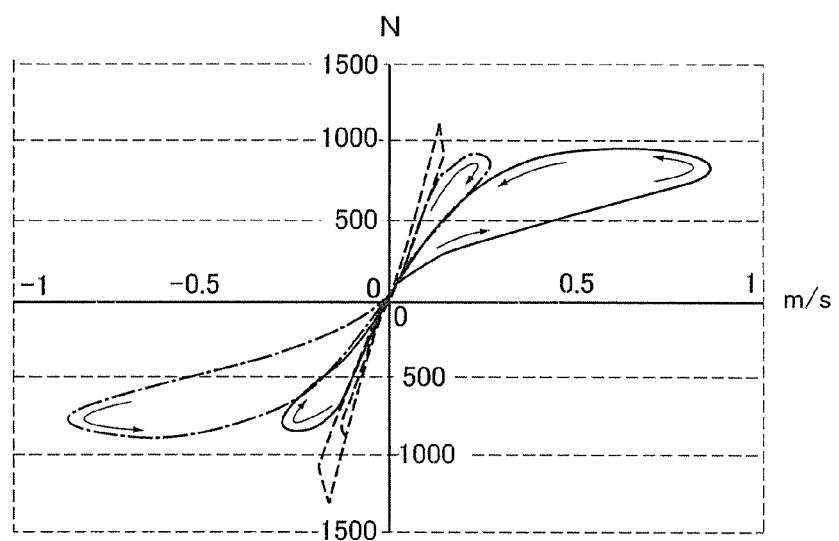
FIG. 5 is a graph showing a result of simulation according to an embodiment of the present invention.

FIG. 5 illustrates a coordinate showing characteristics for a conventional shock absorber, with an abscissa: piston speed (v, m/s) and an ordinate: damping force C(absorber)*v (N), which includes time-variation locus of damping force [C(absorber)*(y'-z')] exerted between the sprung member and the unsprung member, in the case where 12 mm upward and downward step input is applied as the motion caused by the road surface, and the case where the sprung member is applied with acceleration disturbance at approximately 0.2 G upward and downward, under the above-described conditions. The characteristic indicated by the solid line in FIG. 5 shows the variation of damping force of the shock absorber in the case where the road surface is rapidly lifted by 12 mm in a step like manner. The characteristic indicated by the one-dot chain line in FIG. 5 shows the variation of damping force of the shock absorber in the case where the road surface is rapidly lowered by 12 mm in a step like manner. And, the characteristic indicated by the broken line in FIG. 5 shows the variation of damping force of the shock absorber in the case where the external disturbance is input on the sprung member.

Referring to FIG. 5, will be explained the characteristic indicated by the solid line when the road surface has been lifted. Immediately after the road surface has been lifted in the step like manner, the tire is deflected by approximately 12 mm due to the rapid lift, so that this deflection will lift the unsprung member upward. In response to restoration of the deflection, the unsprung member (Y) will be lifted, with its upward velocity being increased, to reach its maximum velocity, and thereafter being decreased to stop. At this time, as the sprung member will not move immediately due to inertia of its large mass, a relative motion between the sprung member and the unsprung member will be caused, to bring the shock absorber into its compressing process, which is shown by the solid line at the right section of FIG. 5. According to its variation, the piston speed is increased from the coordinate origin (0,0) with a low damping, and after it reaches its maximum speed, it is decreased at a little bit higher damping comparing with the damping at the time when it is increased, then it returns to the coordinate origin. In the case where the unsprung member returns to the neutral position, the sprung member has been hardly moved, so that the shock absorber still held in its compressed state will be brought into its extending process, according to lifting motion of the sprung member thereafter. The lifting motion of the sprung member covers a section illustrated in the third quadrant of FIG. 5, wherein the piston speed will be increased in its extending direction, with the sprung member being lifted, according to the damping coefficient (gradient) which is larger than that in the compressing process for the unsprung member's motion. The characteristics for the case where the road surface is lowered will be opposite in terms of the order of the compressing and extending processes, the variation of damping force indicated by one-dot chain line in FIG. 5 will become symmetrical about the coordinate origin comparing with the case where the road surface is lifted, and show the same varying state as that case. In the case where the road surface is listed and lowered in the step like manner, when the sprung member is moved, the damping coefficient comes to be low, whereas when the unsprung member is moved, the damping coefficient comes to be high.

Next, the variation of damping force indicated in the case where the external disturbance is input on the sprung member, becomes the characteristic as indicated by the broken line in FIG. 5. In this case, it can be understood that a high damping coefficient will be continuously provided from the time when the external disturbance is input until it is settled. That is, in the case where the rolling motion is applied to the sprung member due to steering operation, or external force such as cross wind or the like is applied to the sprung member, the rigid damping is provided to prevent the vibration of the sprung member from being caused. Whereas, in the case where the unsprung member is influenced by the variation of the road surface, the soft damping is provided to reduce the force transmitted to the sprung member. In addition to this, although there is still the force reduced to be small through the damping operation and transmitted to the sprung member, the variation of sprung member caused by that force can be prevented by the rigid damping.

According to the embodiment as constituted above, a stable traveling of the vehicle can be ensured only by the present control, without adding other controls, against any variation of the road surface of a stable road or a rough road, as long as it varies within the stroke range of the suspension system. In this case, as the motion is completely separated in a short period between the sprung member and the unsprung member, the pitching motion of the vehicle is very small. Also, as the motion of the sprung member is hardly influenced by the unsprung member, even if the road surface varies, the variation of ground load will be small, to enable a stable travelling of the vehicle with the road surface being firmly gripped and at a high steering stability.

In response to the motion of the sprung member caused by steering operation, each of the four wheels is controlled to keep the distance above the road surface in its neutral position, the vehicle's behavior against the road surface will be stable, so that turning operation can be made in a stable rolling state by the steering operation. As for the disturbance caused by the cross wind, the motion of the sprung member are supported by the rigid damping so as to hold the distance above the road surface in its neutral position, so that variation of the behavior influenced by the cross wind will be made small, to provide a high stability performance against the cross wind.

With respect to the sky hook control as described before, as the shock absorber of the fixed damping coefficient is suspended in the sky, its vibration restraining operation will be limited to a motion with a mechanical free vibration. In contrast, according to the present control law, the control is made on the basis of the physiology of human sensations, whereby any uncomfortable motion can be avoided, to provide an appropriate ride comfort.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A damping characteristics control apparatus for a vehicle suspension having a shock absorber mounted between a sprung member and an unsprung member for each wheel of a vehicle, comprising:
   sprung velocity detection means for detecting a velocity of said sprung member in a moving direction of said shock absorber;
   unsprung velocity detection means for detecting a velocity of said unsprung member in a moving direction of said shock absorber;
   relative displacement detection means for detecting a relative displacement between said sprung member and said unsprung member;
   damping coefficient calculation means for calculating a damping coefficient provided for an equation of motion of said sprung member following said unsprung member, said damping coefficient being obtained by the following equation;

$$C(absorber)=(Gain*|y-z|/|y'|)*[(T|z'|+L)/|y-z|]^p$$

wherein "C(absorber)" is the damping coefficient, "z'" is the sprung velocity, "y'" is the unsprung velocity, "|y-z|" is the relative displacement, "T" is interval time of the sprung member moving relative to the unsprung member, which is used as a parameter for weighting the motion of the sprung member, "L" is a displacement of the sprung member stopped against the unsprung member, "Gain" is a control gain, and "p" is a parameter for determining an effective range for a control about a neutral position of said shock absorber; and
   damping control means for controlling a damping force of said shock absorber on the basis of the damping coefficient calculated by said damping coefficient calculation means.

2. A damping characteristics control apparatus as set forth in claim 1, further comprising:
   sprung acceleration detection means for detecting an acceleration of said sprung member, wherein said sprung velocity detection means integrates the acceleration detected by said sprung acceleration detection means to obtain the velocity of said sprung member.

3. A damping characteristics control apparatus as set forth in claim 1, further comprising:
   relative velocity calculation means for calculating a relative velocity between said sprung member and said unsprung member on the basis of the relative displacement detected by said relative displacement detection means, wherein said unsprung velocity detection means adds the velocity of said sprung member to the relative velocity calculated by said relative velocity calculation means, to obtain the velocity of said unsprung member.

4. A damping characteristics control apparatus as set forth in claim 1, further comprising:
   piston speed detection means for detecting a piston speed of said shock absorber, wherein said unsprung velocity detection means adds the velocity of said sprung member to the piston speed detected by said piston speed detection means, to obtain the velocity of said unsprung member.

* * * * *